US012566803B2

(12) United States Patent
Gwozdz et al.

(10) Patent No.: US 12,566,803 B2
(45) Date of Patent: Mar. 3, 2026

(54) SYSTEM AND METHOD FOR IMPLEMENTING A GUIDED COLLABORATION PLATFORM FOR SPECIFIC DOMAINS

(71) Applicant: KPMG LLP, New York, NY (US)

(72) Inventors: Joseph Gwozdz, Brooklyn, NY (US); Timothy J. Cerino, Hastings on the Hudson, NY (US); Carly Cullen, Washington, DC (US); David Scripka, Acworth, GA (US); Rachel Wagner-Kaiser, Seattle, WA (US)

(73) Assignee: KPMG LLP, New York, NY (US)

( * ) Notice: Subject to any disclaimer, the term of this patent is extended or adjusted under 35 U.S.C. 154(b) by 0 days.

(21) Appl. No.: 18/779,969

(22) Filed: Jul. 22, 2024

(65) Prior Publication Data

US 2025/0028764 A1      Jan. 23, 2025

Related U.S. Application Data

(60) Provisional application No. 63/528,305, filed on Jul. 21, 2023.

(51) Int. Cl.
*G06F 16/93* (2019.01)
*G06F 16/903* (2019.01)

(52) U.S. Cl.
CPC ........ *G06F 16/93* (2019.01); *G06F 16/90335* (2019.01)

(58) Field of Classification Search
CPC .......................... G06F 16/93; G06F 16/90335
See application file for complete search history.

(56) References Cited

U.S. PATENT DOCUMENTS

| | | | |
|---|---|---|---|
| 11,269,665 B1 * | 3/2022 | Podgorny | G06N 20/00 |
| 2017/0099200 A1 * | 4/2017 | Ellenbogen | G06N 3/0464 |
| 2019/0057774 A1 * | 2/2019 | Velez | G16H 50/20 |
| 2024/0403727 A1 * | 12/2024 | Mancilla | G06N 5/01 |
| 2025/0013741 A1 * | 1/2025 | Castrejon, III | G06N 20/00 |
| 2025/0139533 A1 * | 5/2025 | Arnautov | G06F 18/10 |

* cited by examiner

*Primary Examiner* — Tyler J Torgrimson
(74) *Attorney, Agent, or Firm* — HUNTON ANDREWS KURTH LLP

(57) ABSTRACT

The invention relates to computer-implemented systems and methods for analyzing and standardizing various types of input data such as structured data, semi-structured data, unstructured data, and images and voice. An embodiment of the present invention relates to a guided collaboration space for domain experts, data scientists and solution managers to build Artificial Intelligence (AI)/Machine Learning (ML) solutions, deploy solutions at scale as well as manage quality and consistency.

20 Claims, 15 Drawing Sheets

Corpus management

| DOCUMENTS | CORRUPTED | FILE TYPES |
|---|---|---|
| 72,125 | 21 | 6 |

Q Search by Title or ID        + Add filter        Sort ▽        □ 88 ▣

| Doc ID | File Size | Type | Corrupted | Cleaned | Upload Date | Customer ID |
|---|---|---|---|---|---|---|
| Document Title ID 12345 | 108 | PDF | ✓ | - | 10/03/2022 | 78910 |
| Document Title ID 12345 | 108 | PDF | - | ✓ | 10/03/2022 | 78910 |
| Document Title ID 12345 | 108 | PDF | - | ✓ | 10/03/2022 | 78910 |

Figure 9

Cancel        Create batch

What is governing law?

Find 5 examples that are most relevant to the question above, and send them to the verified examples queue on the right.

🔍 governing law                                          x        Advanced search

VERIFIED EXAMPLES

The PSA will be governed by the laws of the State of New York. Each party to the PSA will waive its respective right to a jury trial for any claim or cause of action based upon or arising out of or related to the PSA or certificates. Additionally, each party to the PSA will consent to the jurisdiction of any New York State and Federal courts sitting in New York City with respect to matters arising out of or related to the PSA.

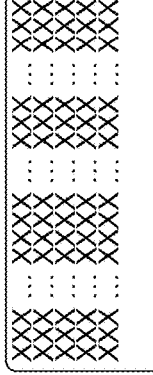
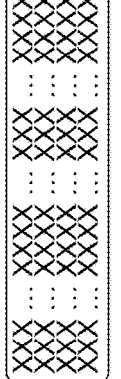
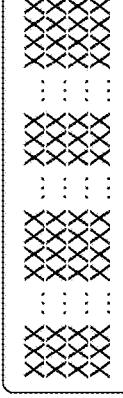

5/5 EXAMPLES ADDED

🔍 Refine search results

Search results (2,226)

The PSA will be governed by the laws of the State of New York. Each party to the PSA will waive its respective right to a jury trial for any claim or cause of action based upon or arising out of or related to the PSA or certificates. Additionally, each party to the PSA will consent to the jurisdiction of any New York State and Federal courts sitting in New York City with respect to matters arising out of or related to the PSA.

↗        ✓ Added to examples

The PSA will be governed by the laws of the State of New York. Each party to the PSA will waive its respective right to a jury trial for any claim or cause of action based upon or arising out of or related to the PSA or certificates. Additionally, each party to the PSA will consent to the jurisdiction of any New York State and Federal courts sitting in New York City with respect to matters arising out of or related to the PSA.

↗        + Add to examples

Figure 10

SYSTEM AND METHOD FOR IMPLEMENTING A GUIDED COLLABORATION PLATFORM FOR SPECIFIC DOMAINS

CROSS-REFERENCE TO RELATED APPLICATIONS

The application claims priority to U.S. Provisional Application 63/528,305, filed Jul. 21, 2023, the contents of which are incorporated by reference herein in its entirety.

This application relates to U.S. patent application Ser. No. 16/159,088, filed on Oct. 12, 2018 and now U.S. Pat. No. 10,846,341, which claims the benefit of the filing date of, and incorporates by reference thereto in its entirety, U.S. Provisional Patent Application Ser. No. 62/572,266, filed on Oct. 13, 2017.

FIELD OF THE INVENTION

The present invention relates to systems and methods for a collaboration platform that supports analyzing and standardizing various types of input data, and generating responses to specific questions based on the standardized input data.

BACKGROUND

The digitization of labor continues to progress as advancements in machine learning, natural language processing, data analytics, mobile computing and cloud computing are used in various combinations to replace certain processes and functions. Basic process automation can be implemented without significant IT investment as solutions may be designed, tested and implemented for a relatively low cost. Enhanced process automation incorporates more advanced technologies that enable the use of data to support elements of machine learning. Machine learning tools can be used to discover naturally-occurring patterns in data and to predict outcomes. And natural language processing tools are used to analyze text in context and extract desired information.

Current systems, however, lack the ability to enable domain experts and other users to create domain specific solutions. Bespoke environments are cost prohibitive to build and even more difficult to maintain. Moreover, ground truth labeling is extremely tedious and drains a majority of any project budget. Current deployment procedures are time-consuming and the lack of a defined standard further contributes to the complexities and inefficiencies.

It would be desirable, therefore, to have a system and method that could overcome the foregoing disadvantages of known systems and that could apply automated and customized analysis to analyze documents, communications, text files, websites, and other structured and unstructured input files to generate an output in the form of answers to specific questions and other supporting information.

SUMMARY

According to an embodiment, the invention relates to a computer-implemented system for implementing a collaboration platform that analyzes structured and unstructured data. The system comprises: a file ingestion interface that communicates with one or more data sources via a communication network; and a computer processor coupled to the file ingestion interface and further programmed to perform the steps of: ingesting, via the file ingestion interface, unstructured data from the one or more data sources; initiating an annotation process that comprises: (1) applying a corpus exploration tool to identify a representative set from a corpus that comprises the unstructured data wherein the representative set is relevant to a specific query and (2) applying a rapid annotation tool that applies an artificial intelligence (AI) tool to extract responses relevant to the query as applied to the representative set; enabling, via a collaboration interface, a subject matter expert (SME) to perform a verification on the responses extracted from the representative set; based on the verification, refining the responses through a feedback process that applies the responses to the annotation process through a machine learning (ML) algorithm; and responsive to the annotation process, building a model to identify and extract a response relevant to the query as applied to a specified input.

According to an embodiment, the invention relates to a computer-implemented method for implementing a collaboration platform that analyzes structured and unstructured data. The method comprises the steps of: ingesting, via a file ingestion interface, unstructured data from the one or more data sources wherein the file ingestion interface that communicates with one or more data sources via a communication network; initiating, via a computer processor, an annotation process that comprises: (1) applying a corpus exploration tool to identify a representative set from a corpus that comprises the unstructured data wherein the representative set is relevant to a specific query and (2) applying a rapid annotation tool that applies an artificial intelligence (AI) tool to extract responses relevant to the query as applied to the representative set; enabling, via a collaboration interface, a subject matter expert (SME) to perform a verification on the responses extracted from the representative set; based on the verification, refining the responses through a feedback process that applies the responses to the annotation process through a machine learning (ML) algorithm; and responsive to the annotation process, building a model to identify and extract a response relevant to the query as applied to a specified input.

An embodiment of the present invention relates to a guided collaboration platform for domain experts, data scientists and solution managers to build Artificial Intelligence (AI)/Machine Learning (ML) solutions, deploy solutions at scale as well as manage quality and consistency. An embodiment of the present invention is directed to interacting with domain experts, through an innovative collaboration platform, in an efficient manner that maximizes productivity and minimizes time and associated costs.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 9 is an exemplary user interface, according to an embodiment of the present invention.

FIG. 10 is an exemplary user interface, according to an embodiment of the present invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

An embodiment of the present invention is directed to an end-to-end solution that analyzes a large corpus of data in various formats and from disparate sources to intelligently and accurately identify a domain specific subset of data for efficient interactions with highly specialized subject matter experts including data scientists, Artificial Intelligence (AI)/ Machine Learning (ML) experts, etc.

An embodiment of the present invention is directed to an innovative annotation feature for use with long-form unstructured data, such as prospectus and financial documents that are generally not in the public domain. Current solutions and systems are unable to properly analyze and ingest long-form unstructured data as this type of data is highly specialized and complex.

An embodiment of the present invention is directed to a guided collaboration platform for domain experts, data scientists and/or solution managers to build AI/ML solutions, deploy these solutions at scale and manage quality and consistency.

An embodiment of the present invention is directed to an interface that connects to a system such as the ones described in U.S. Pat. No. 10,846,341, which is incorporated by reference herein in its entirety. Such systems support analyzing and standardizing various types of input data such as structured data, semi-structured data, unstructured data, and images and voice and also generating responses to specific questions based on the standardized input data.

An embodiment of the present invention seeks to expand industry opportunities and applications, such as information management and technology, retail and ecommerce, healthcare and others, and further expand the current user base and reduce time to market.

Figure 1:
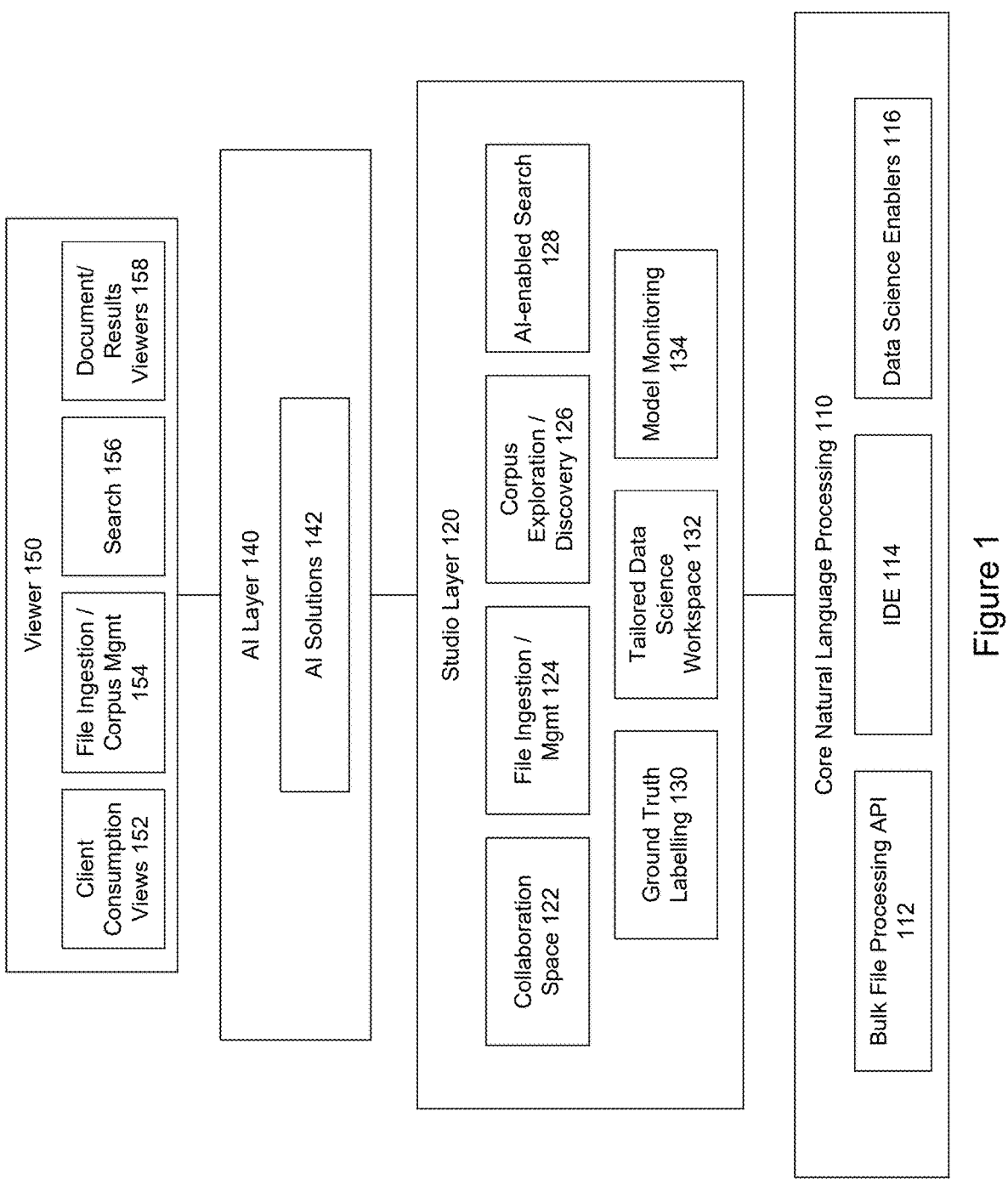
FIG. 1 is an exemplary system diagram, according to an embodiment of the present invention.

FIG. 1 is an exemplary system diagram, according to an embodiment of the present invention. FIG. 1 illustrates multiple layers in an exemplary ecosystem as shown by Core Natural Language Processing 110, Studio Layer 120, AI Layer 140 and Viewer 150. Other features and functions may be supported.

Core Natural Language Processing 110 may include Bulk File Processing API 112, Integrated Development Environment (IDE) 114, and Data Science Enablers 116.

Studio Layer 120 may include Collaboration Space 122 for teams and various users to develop extraction models and other models. Additional functionality may include: File Ingestion/Management 124; Corpus Exploration/Discovery 126; AI-enabled Search 128; Ground Truth Labelling 130; Tailored Data Science Workspace 132; and Model Monitoring 134.

AI Layer 140 may support AI Solutions 142 which represent customizable solutions designed to address and solve specific business challenges.

Viewer 150 may include Client Consumption Views 152; File Ingestion/Corpus Management 154; Search 156 and Document/Results Viewers 158. Other outputs and interfaces may be implemented.

An embodiment of the present invention is directed to identifying a representative set of data/documents that provides a unique subset of excerpts that specifically and precisely address an issue or answer a question. The representative set of data/documents may be uniquely identified from a very large corpus of documents that would be otherwise tedious and time consuming to review individually even with the assistance of search tools.

An exemplary issue or question may include: "what is the governing law?" This issue or question may be applied to a corpus of data (e.g., security prospectus, debt deal documentation, etc.) in various formats and from disparate sources. An embodiment of the present invention recognizes that there may be many different ways of identifying the governing law in contracts and other documents. For example, documents may have varying formats, disparate document structures, differences in terms/language/descriptions as well as other particulars specific to a type of document, technology field and/or source of information. Instead of individually annotating thousands and thousands of documents, an embodiment of the present invention precisely identifies a representative collection of data/sections of documents that captures a unique set of excerpts. In this example, an embodiment of the present invention may identify 20 different ways of identifying governing law in various documents. This may mean from 10,000 documents, there may be 20 representative sections that uniquely identify the relevant sections that address the question at issue. Other examples may involve medical documents, technical information, images, audio, video, etc.

Using heuristics and semantic search terms, an embodiment of the present invention may identify seed language that may be used to narrow a corpus of documents to a representative set of governing law language. This may significantly narrow a corpus from 10,000 documents to a smaller subset. For example, this may result in a representative set (e.g., 50-100 documents or smaller percentage (approximately 5%) of a corpus) of high quality matches for a rapid focused review.

The results may then be filtered using terms to identify semantically similar datasets that contain a response to the query at issue which in this case is "what is the governing law." This approach may then identify "seed" examples that represent high quality unique governing law language, e.g., federal law, state law, prospectus, contract, etc. For example, an embodiment of the present invention may avoid identifying multiple examples that are the same or very similar. The high quality unique seed examples may then be intelligently applied back to the process as feedback, using AI/ML, to refine the subset even further to focus the high quality examples. The process may continue until a small number or percentage of representative sections of higher quality and of different flavors of governing law, in this example, are identified.

An embodiment of the present invention is directed to focusing on a domain centric rapid labeling methodology to minimize cost, time and resources. This further improves accuracy and addresses the significant time and resource problem with current systems and technical approaches.

For example, the representative set may identify high quality unique excerpts of governing law. Domain experts (or Subject Matter Experts (SMEs)) may then verify the representative set instead of the entire corpus of documents. Current systems would require a review of more than approximately 10,000 prospectus documents to identify various types of governing law. By identifying the governing law in select passages with particular accuracy and speed, an embodiment of the present invention then enables SMEs to perform a fine grain search and/or analysis to further narrow the universe of results. According to an exemplary scenario, the system may highlight excerpts that answer the question (e.g., what is the governing law) where the SME may accept or reject the answer upon review. This results in a hyper focused and efficient process that is not available with current systems or known technologies. The verified results may be used to further refine the search process through a rapid review quality process.

An embodiment of the present invention may then build a model to accurately identify and extract the governing law in any given contract, document and/or other input regardless of format, structure, language, etc. This provides flexibility, applicability and uniformity across various inputs, documents and sources to address a wide range of queries.

An embodiment of the present invention may be implemented in various architectures including as micro-services, an application, a mobile tool-kit, on-premise, etc. An embodiment of the present invention may run on a cluster or a single node architecture. For example, an embodiment of the present invention may provide the innovative labeling service to offsite client locations. Certain clients, such as banks and financial institutions, may not be able to electronically share documents for security and privacy reasons. In this example, an embodiment of the present invention may operate as a mobile tool-kit or other portable mechanism that may be applied to off-site client projects.

Figure 2:
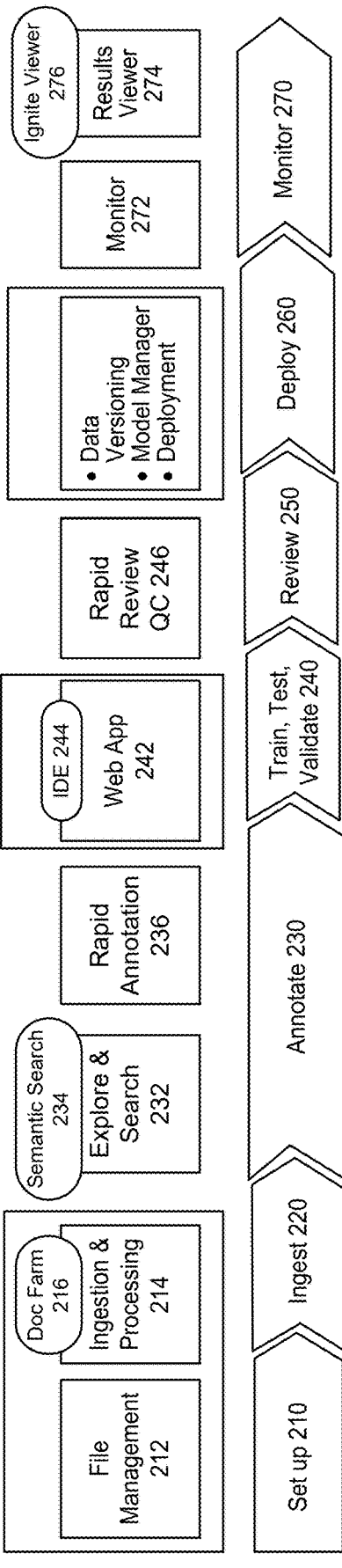
FIG. 2 is an exemplary flow diagram, according to an embodiment of the present invention.

FIG. 2 is an exemplary flow diagram, according to an embodiment of the present invention. FIG. 2 illustrates an experience and solution management process flow. At step 210, a set-up process may be initiated. At step 220, data may be received and ingested. At step 230, an annotation process may be executed. At step 240, training, testing and validating may be performed. Data may be reviewed at step 250, deployed at step 260 and then monitored at step 270. While the process of FIG. 2 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

Set Up 210 and Ingest 220 may interact with File Management 212 and Ingestion & Processing 214 (Document Farm 216). An embodiment of the present invention is directed to ingesting a file; providing file management and processing; and performing quality checks on the file.

Annotate 230 may involve functions such as Explore and Search 232 (e.g., Semantic Search 234) and Rapid Annotation 236.

An embodiment of the present invention is directed to an annotation/labeling feature as applied to unstructured data, such as security prospectus, mutual fund prospectus, loan documents, etc. Within the context of an embodiment of the present invention, the term "label" or "annotate" may generally refer to capturing information about documents within a specific use case.

The Explore & Search 232 and Rapid Annotation 236 aspects of an embodiment of the present invention provides efficient management of time and resources associated with a targeted involvement of SMEs. By identifying a representative set of data for review, SMEs can focus their time and effort on a minimum set of documents for labeling and annotation thereby creating significant value while realizing efficiencies.

Train, Test and Validate 240 may execute on a web-based interactive computing platform, such as Web Application 242 (e.g., Jupyter Notebook or other tool or application for interactively developing and presenting data projects), and Integrated Development Environment (IDE) 244.

Review 250 may involve a Rapid Review Quality Control (QC) process, as shown by 246. This may provide data enrichment to manage the quality of an optical character recognition (OCR) process. In addition, an embodiment of the present invention may be directed to clustering data to identify anomalies prior to the annotation phase. Applying data enrichment to an OCR engine further improves the quality of any downstream output.

An embodiment of the present invention is directed to a data enrichment process that promotes and enables democratization. Instead of requiring a data scientist to write the extraction rules, a business user may submit a similar request using search terms and low code tools. By performing data enrichment upfront, more users may participate in the process through low code democratized tools.

Deploy 260 may involve Data Versioning, Model Manager and Deployment.

The Monitor step at 270 may include functions such as Monitor 272 and Results Viewer 274, e.g., Ignite Viewer 276.

Figure 3:
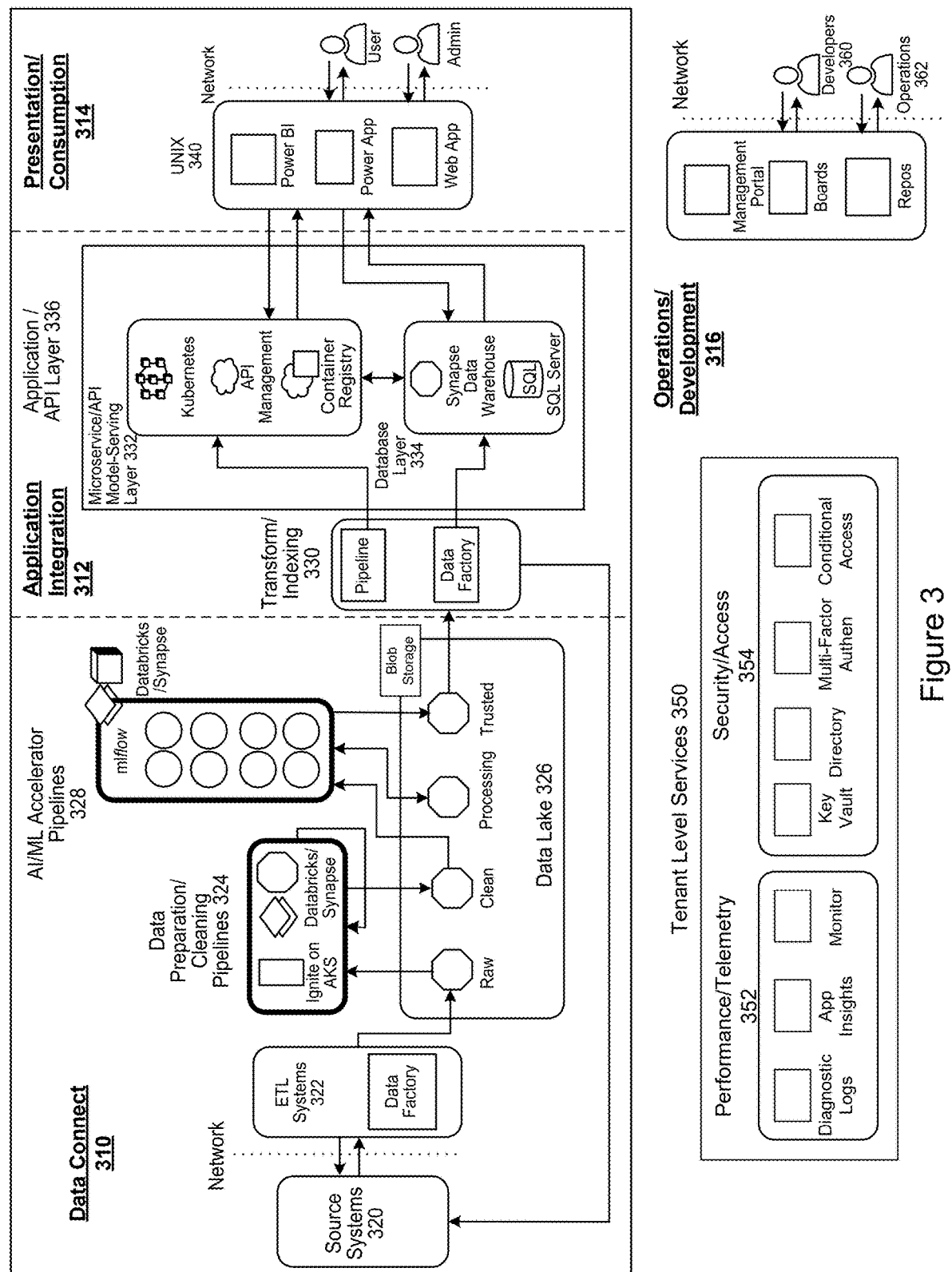
FIG. 3 is an exemplary system diagram, according to an embodiment of the present invention.

FIG. 3 is an exemplary system diagram, according to an embodiment of the present invention. For example, FIG. 3 illustrates a Connected Platform Logical Diagram that supports Data Connect 310, Application Integration 312, Presentation/Consumption 314 and Operations/Development 316.

Data Connect 310 may include Source Systems 320, Extract Transform Load (ETL) Systems 322, Data Preparation/Cleaning Pipelines 324, AI/ML Accelerator Pipelines 328, and Data Lakes 326.

Source Systems 320 may represent systems of record containing needed enterprise resource planning (ERP), data management tools such as common data model (CDM), business process data, etc. ETL Systems 322 may include applications to connect and extract needed data from source systems. Data Preparation/Cleaning Pipelines 324 may include CDM processing, cleaning, etc. An analysis system, such as Ignite (as described in U.S. Pat. No. 10,846,341), may be incorporated to translate unstructured data into structured data. Data Management may provide statistical data assessment. AI/ML Accelerator Pipelines 328 may include AI/ML modeling, training, validating, testing for each of the use cases. AI/ML Accelerator Pipelines 328 may include a platform for managing machine learning work-flows to enable and support machine learning solution development. Data Lake 326 may support various buckets and components, represented by Raw, Clean, Processing and Trusted. Raw may provide a landing bucket for raw data from ETL jobs. Clean may represent a clean bucket for quality controlled data (e.g., common data models). Processing may include immediate outputs from apps, accelerators, etc. Trusted may include final data outputs/models from application accelerators (e.g., model, AI results, etc.).

Application Integration 312 may include Transform/Indexing 330 and Application/API Layer 336. Transform/Indexing 330 may include continuous integration (CI)/continuous development (CD) pipelines for dockerizing (or containerizing) model services and data factory indexing model results into a database for serving. Dockerizing may refer to adapting or configuring an application or service to work within a container. Application/API Layer 336 may provide AI/ML model serving accelerator model results to an application layer. Microservice/API Model-Serving Layer 332 and Database Layer 334 may serve models and application API connections.

Presentation/Consumption 314 may include UNIX 340 and user interfaces. UNIX 340 may enable users to consume model insights via Power BI, Power Apps, or Web Apps visualizer/exploration. Presentation/Consumption 314 may support various users and administrators.

Operations/Development 316 may support developers 360 and operations 362 that interact with the platform through a service connection to a management portal, DevOps, etc. Tenant Level Services 350 may include Performance/Telemetry 352 and Security/Access 354. Performance/Telemetry 352 may provide diagnostic logs, application insights and monitoring features. Security/Access 354 may support security features through components, such as key vault, directory, multi-factor authentication and conditional access.

An embodiment of the present invention may support various functions including file ingest and corpus management, exploration and semantic search, rapid annotation review and data labeling quality assurance. An embodiment of the present invention may be supported by Data Preparation/Cleansing Pipelines 324 and AI/ML Accelerator Pipelines 328, within Data Connect 310.

Figure 4:
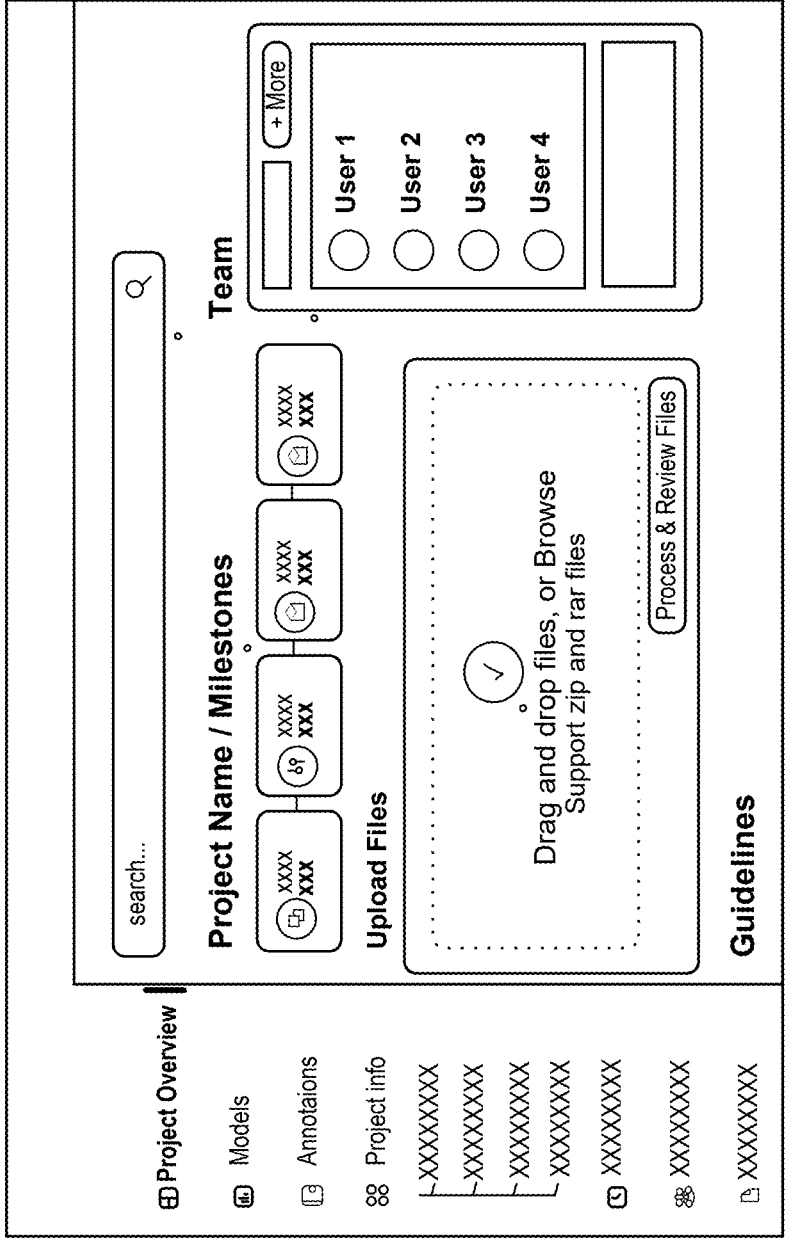
FIG. 4 is an exemplary user interface, according to an embodiment of the present invention.

FIG. 4 is an exemplary user interface, according to an embodiment of the present invention. FIG. 4 illustrates an interface that supports file ingest and corpus management. FIG. 4 shows a Project Overview including Project Name/Milestones and an ability to upload files and/or other data.

Figure 5:
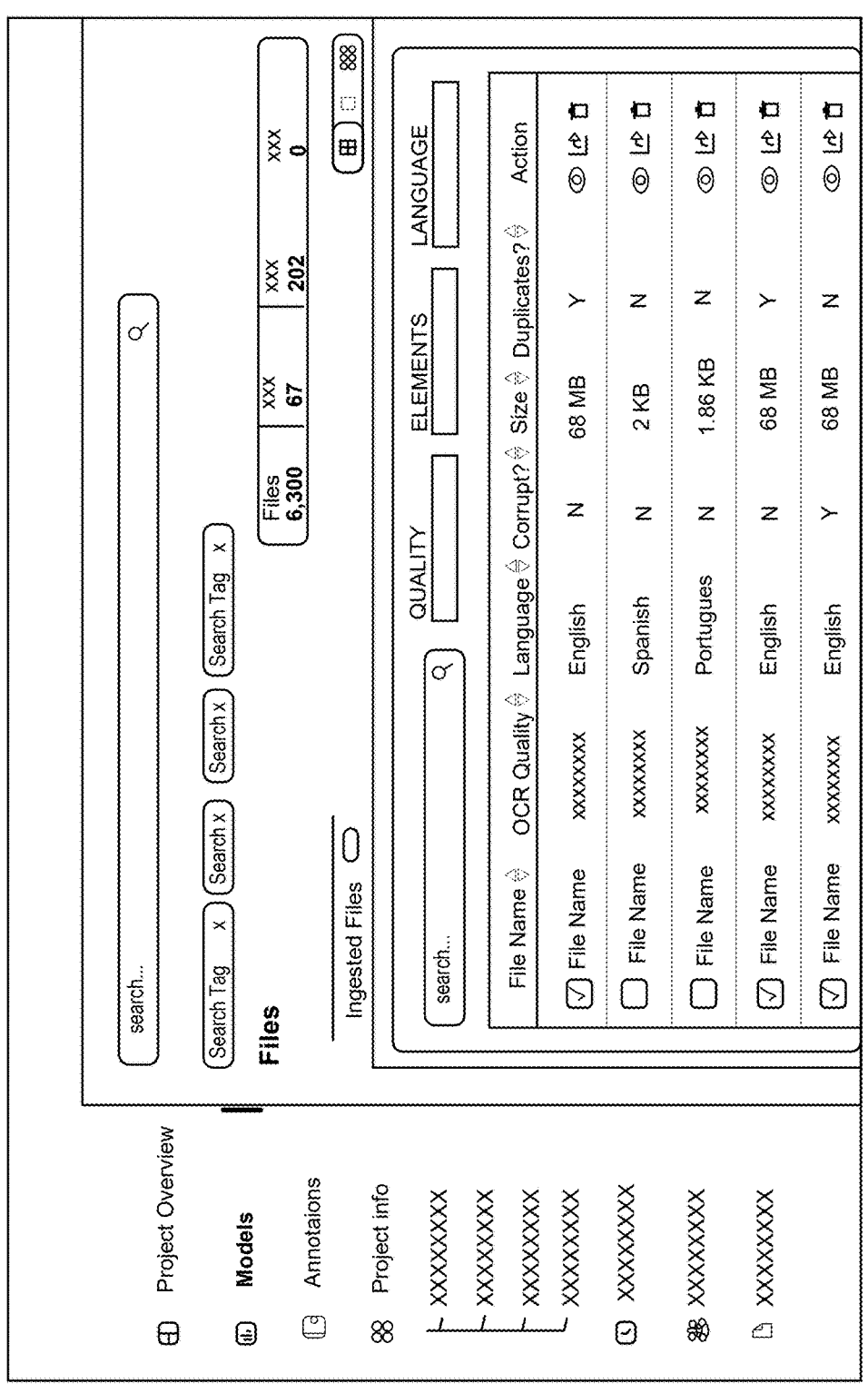
FIG. 5 is an exemplary user interface, according to an embodiment of the present invention.

FIG. 5 is an exemplary user interface, according to an embodiment of the present invention. FIG. 5 illustrates an interface that supports exploration and semantic search. Search terms may be provided and results may be shown by file name, OCR quality, language, corrupt, size, duplicates and Action.

Figure 6:
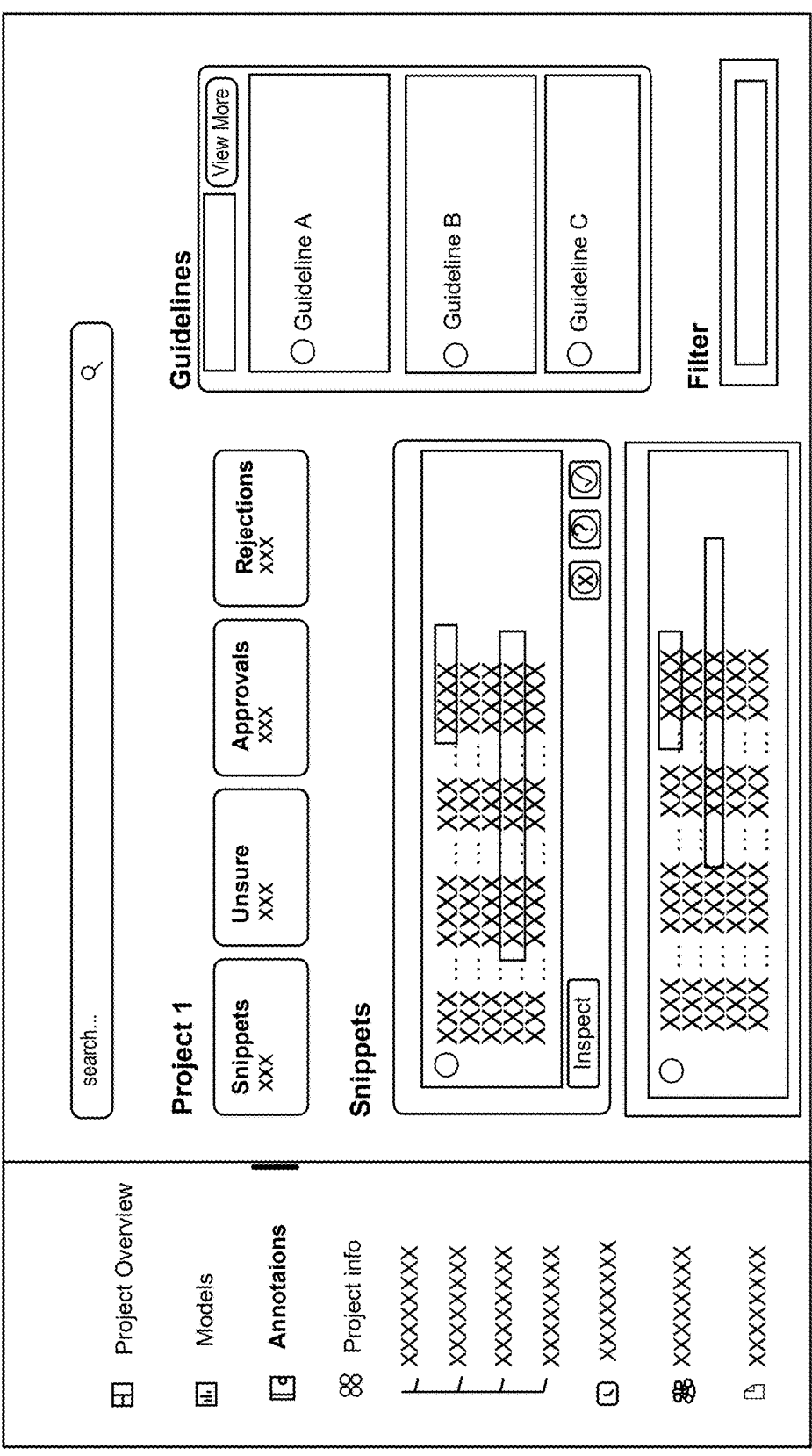
FIG. 6 is an exemplary user interface, according to an embodiment of the present invention.

FIG. 6 is an exemplary user interface, according to an embodiment of the present invention. FIG. 6 illustrates an interface that supports rapid annotation review. Annotations may be displayed where various categories may be provided including Snippets, Unsure, Approvals and Rejections. Corresponding guidelines may be provided as well as various Filters.

As the user interacts with the annotations, the user interface may provide relevant guidelines that provide a summary of best practices. This promotes consistency across reviews performed by various SMEs, etc. In addition, the guidelines may realize efficiencies by minimizing duplicates. In this example, the guidelines may guide the user to avoid annotating language that has already been addressed.

As shown in FIG. 6, guidelines may be specific to a client, industry, application, use case, environment, etc. An embodiment of the present invention may support engaging a client to identify a definition of what "good" looks like. This is generally performed without examining all the permutations of terms in a contract or other document. As the innovation iterates through the process through AI/ML, variations of language and terms may be identified. As variations are identified, the corresponding guidelines may be updated, revised, etc. In some instances, as new terms are identified, an embodiment of the present invention may verify applicability and relevancy with the client and/or other source. Further, corrections and revisions may be applied through AI/ML to language that needs to be considered.

Figure 7:
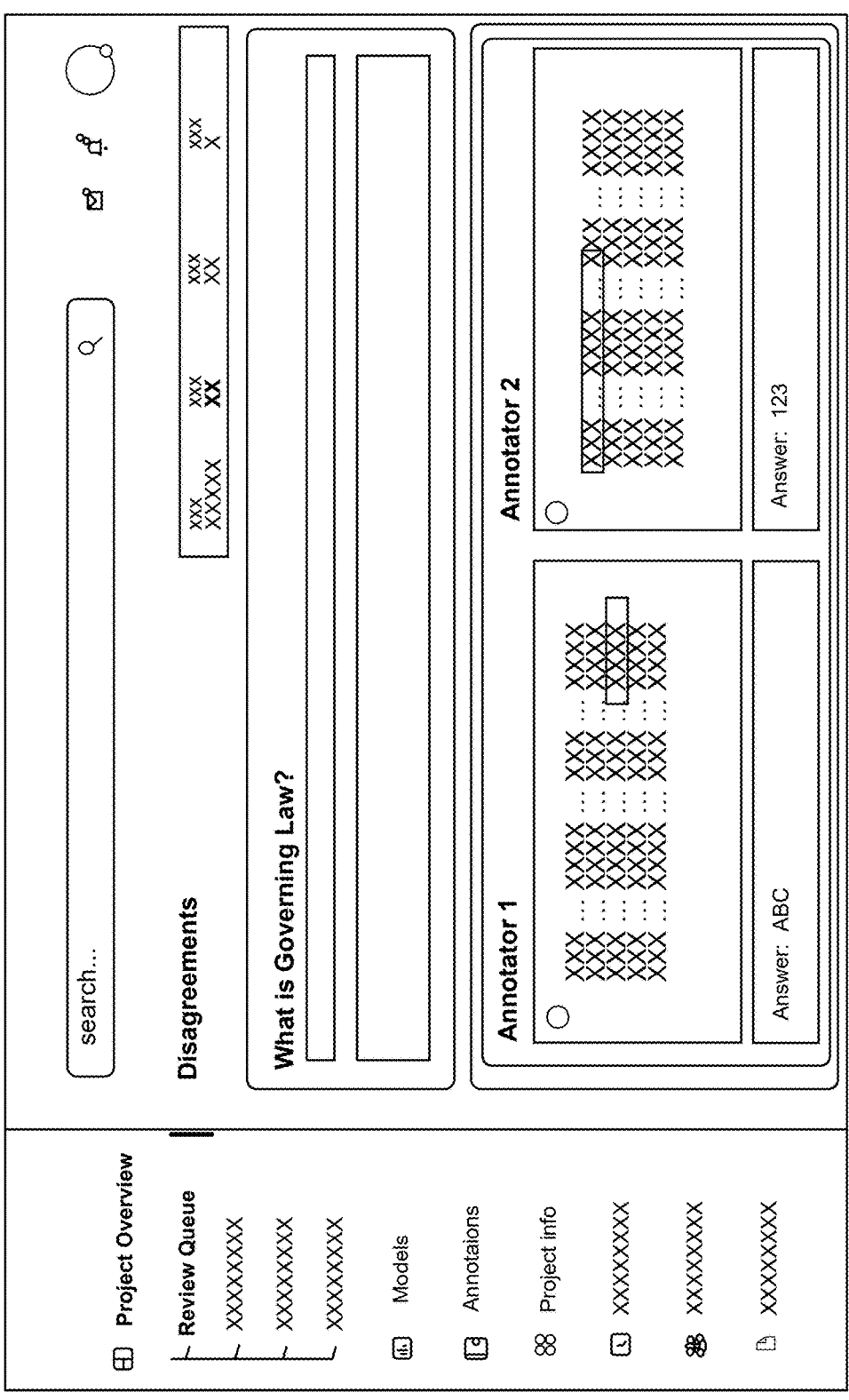
FIG. 7 is an exemplary user interface, according to an embodiment of the present invention.

FIG. 7 is an exemplary user interface, according to an embodiment of the present invention. FIG. 7 illustrates an interface that supports data labeling quality assurance. FIG. 7 shows a Review Queue where Disagreements may be displayed. The governing law may be provided along with competing annotations.

As part of the review process, an embodiment of the present invention may provide an arbitration queue where competing interpretations may be resolved for consistency and quality control. For example, a senior user may make a decision regarding interpretation, applicability, etc. This may also involve seeking client approval, etc. Further, based on the results, an embodiment of the present invention may also revise guidelines and further update the process.

Figure 8:
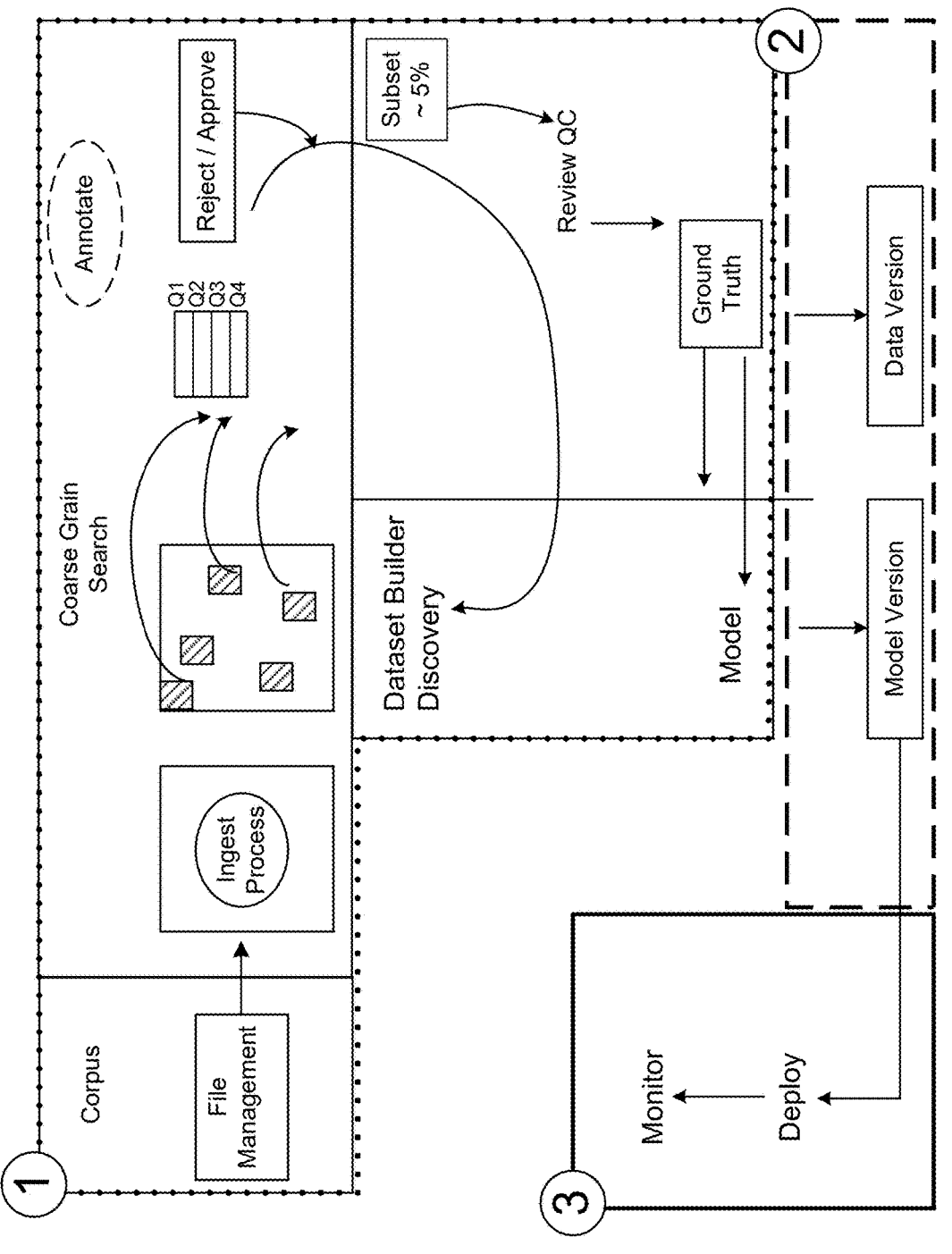
FIG. 8 is an exemplary diagram, according to an embodiment of the present invention.

FIG. 8 is an exemplary diagram, according to an embodiment of the present invention. Corpus of data may be represented by File Management. Data may be received by an ingestion process. Coarse Grain search results may be annotated. Dataset Builder Discovery may support quality control processes that identify a ground truth that results in Model Version and Data Version. Results may include Deployment and Modeling.

As shown in FIG. 8, an embodiment of the present invention is directed to a search feature that supports coarse grain analysis which feeds into the Rapid Annotation feature as it provides fine grain analysis and support.

An embodiment of the present invention is directed to a corpus exploration feature that enables users to efficiently understand the contents of a corpus and identify patterns and shared attributes across the documents. For example, this feature enables a user to construct a set of queries that explores a particular business use-case by focusing on terms, document language, and metadata relevant to that use-case, and further identifies the subsets of documents that most directly relate to the query.

FIG. 9 is an exemplary user interface, according to an embodiment of the present invention. FIG. 9 illustrates a corpus exploration feature that enables a user to assess/explore the data as well as tasks performed by data scientist, SME, and/or other users. As shown by FIG. 9, a Corpus management interface illustrates Documents, Corrupted and File Types. Filters may be applied where result details include document identifier, file size, type, corrupted, cleaned, upload date and customer identifier.

FIG. 10 is an exemplary user interface, according to an embodiment of the present invention. FIG. 10 illustrates an annotation example and guidelines which may be considered primarily an SME task, but with input from data scientists on format, data labeling, etc. This feature provides instructions/ examples for the annotators. The example of FIG. 10 relates to identifying governing law with search results and verified examples.

Figure 11:
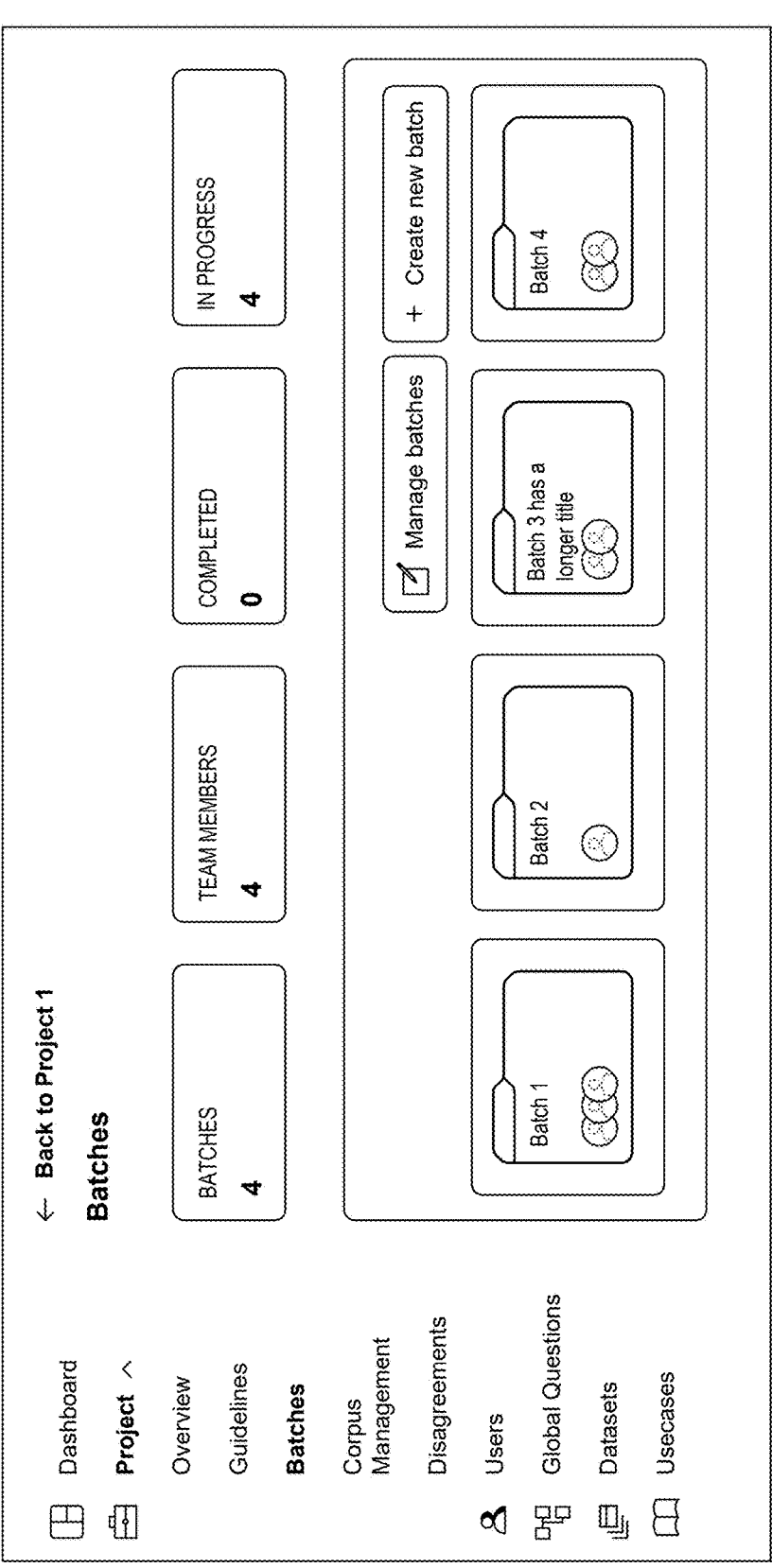
FIG. 11 is an exemplary user interface, according to an embodiment of the present invention.

FIG. 11 is an exemplary user interface, according to an embodiment of the present invention. An embodiment of the present invention may be directed to creating annotation batches where data scientists may identify batches for annotators. This may be performed by identifying and/or leveraging different cuts of the dataset, with a goal to maximize variation and minimize annotator time. As shown in FIG. 11, four exemplary batches are illustrated.

Figure 12:
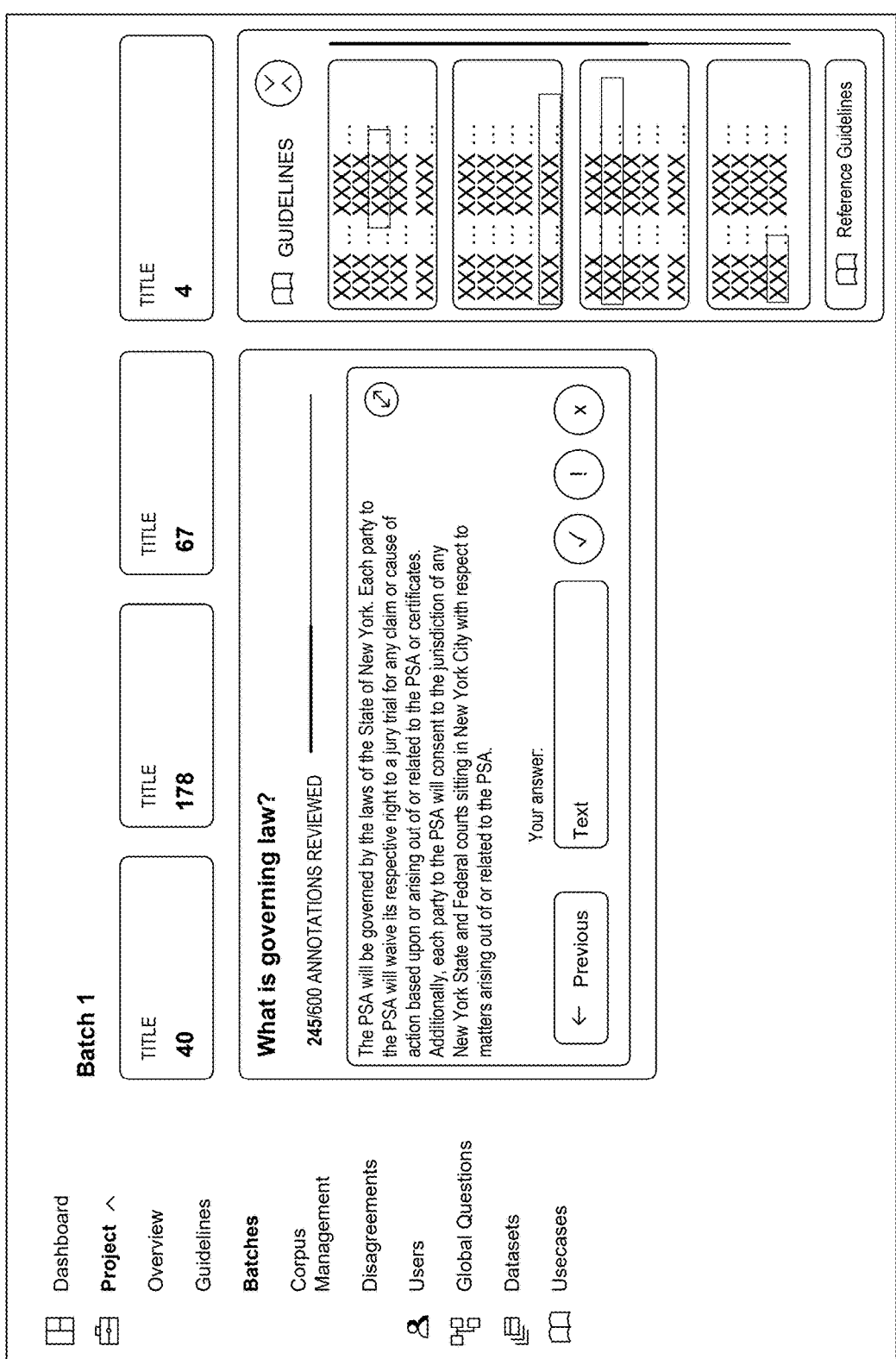
FIGS. 12 and 13 represent exemplary user interfaces, according to an embodiment of the present invention.
Figure 13:
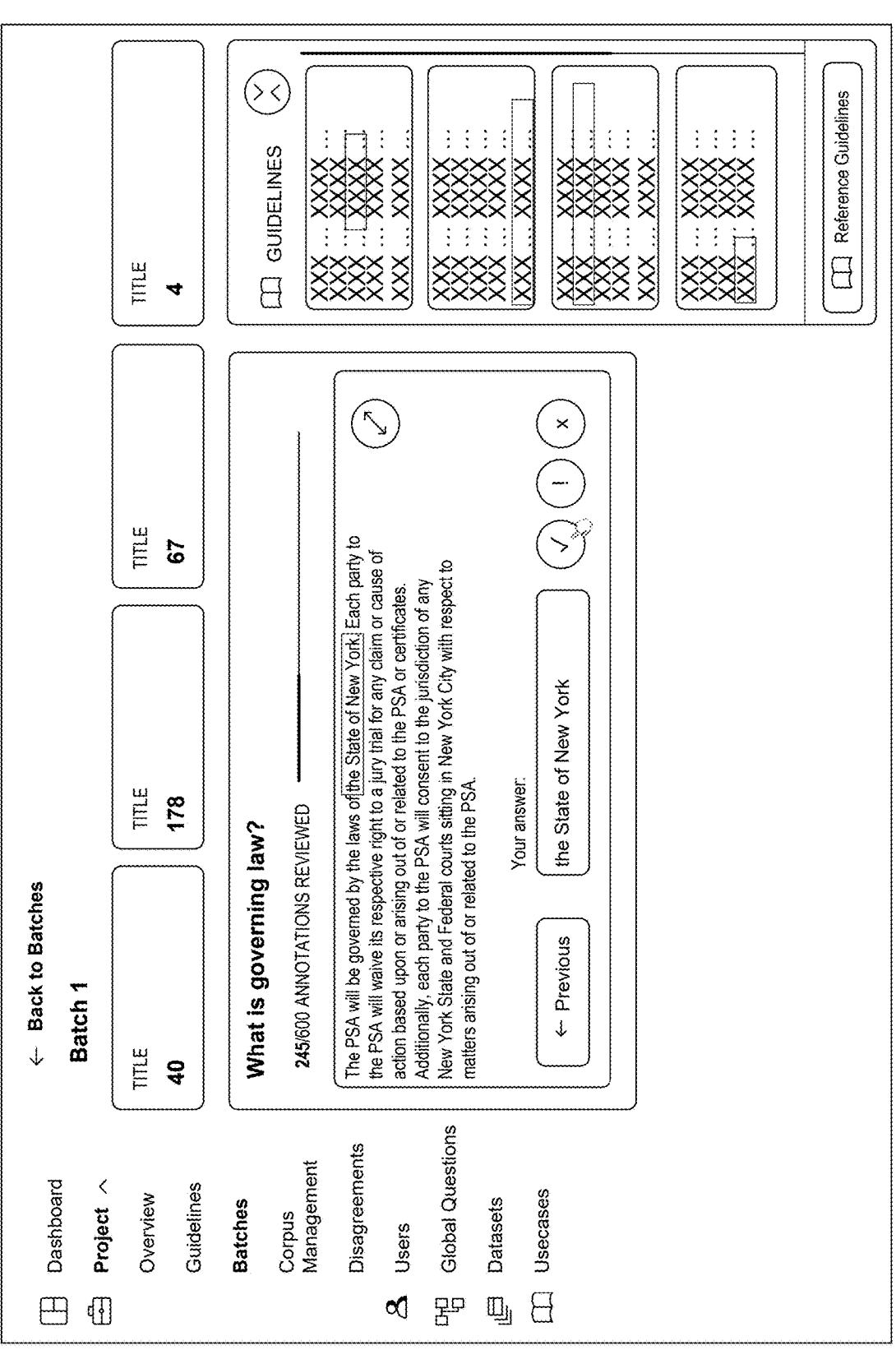

FIGS. 12 and 13 represent exemplary user interfaces, according to an embodiment of the present invention. With an embodiment of the present invention, annotators may leverage guidelines, SME advice, and data scientist-created batches to create labeled datasets. As shown in FIG. 13, a SME may provide an answer (e.g., the State of New York) to the inquiry.

Figure 14:
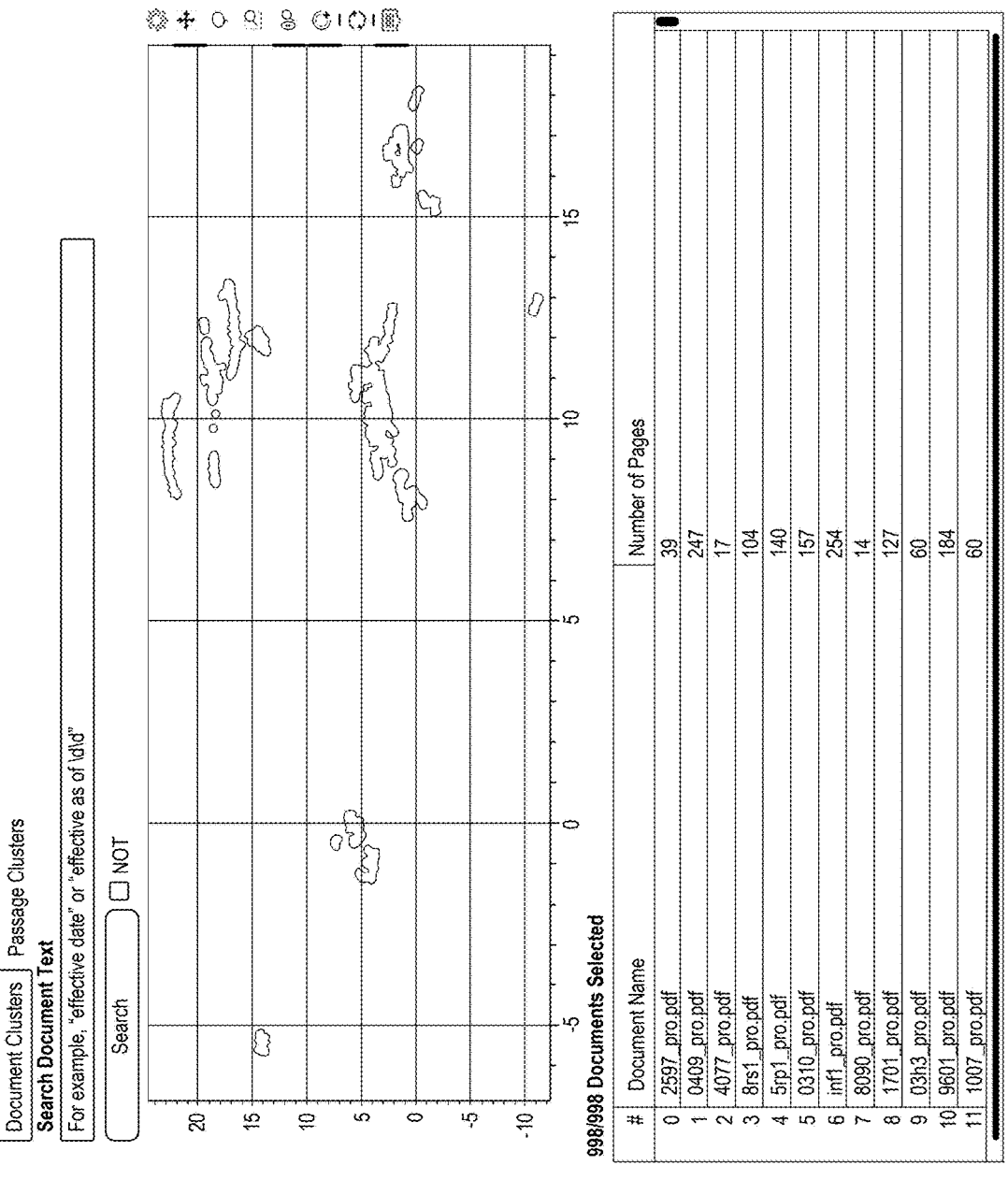
FIGS. 14 and 15 represent exemplary user interfaces, according to an embodiment of the present invention.
Figure 15:
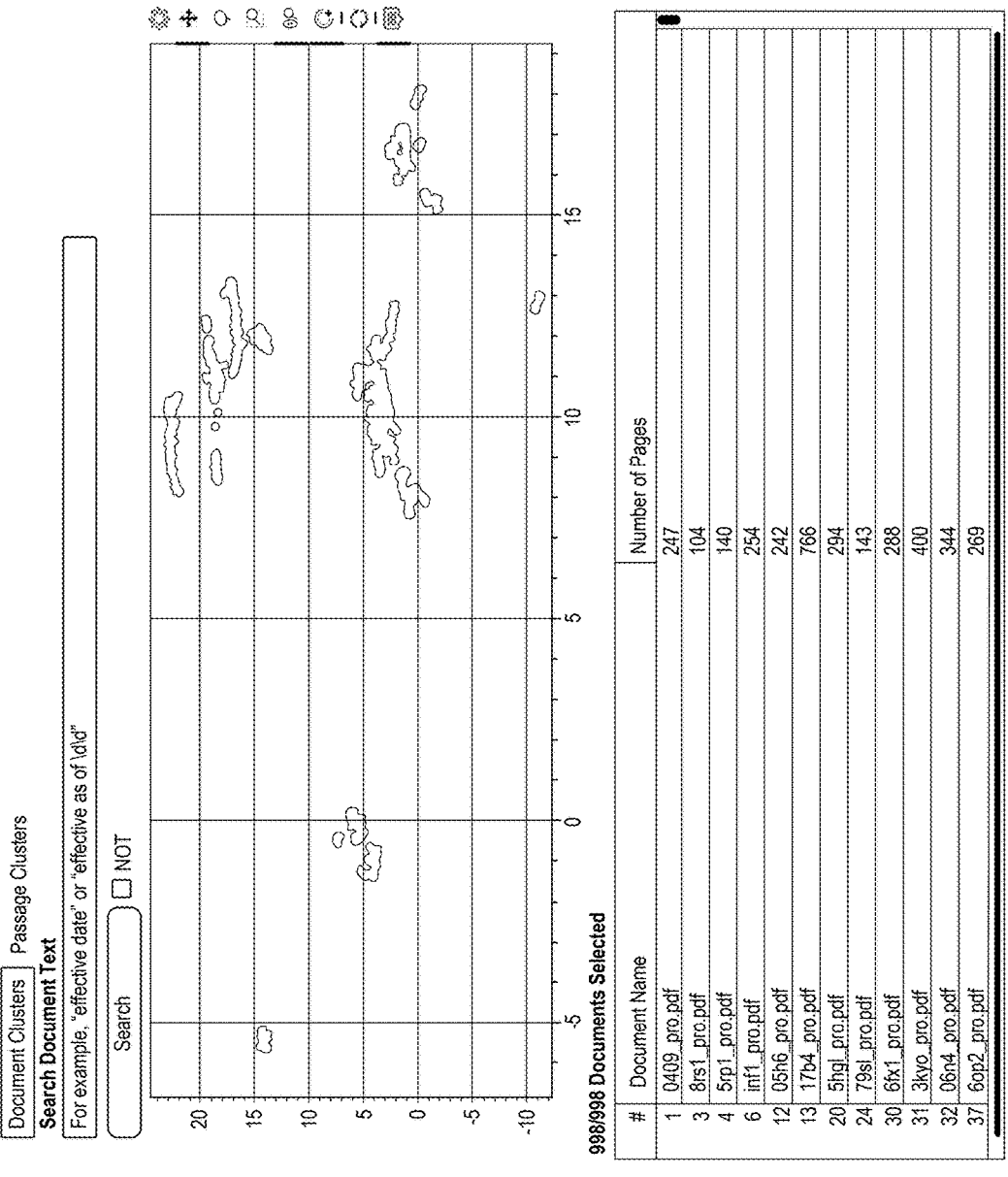

FIGS. 14 and 15 represent exemplary user interfaces, according to an embodiment of the present invention. An embodiment of the present invention is directed to demonstrating an exploration interface. FIGS. 14 and 15 illustrate representative document clusters. Other types of clusters, including passage clusters, may be analyzed.

The corpus exploration functionality enables a user to efficiently understand the contents of a corpus and identify patterns and shared attributes across the documents. It further enables a user to construct a set of queries that explores a particular business use-case by focusing on the terms, document language, and/or metadata relevant to that use-case, and helps identify the subsets of documents that most directly relate to the query.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements.

The foregoing descriptions provide examples of different configurations and features of embodiments of the invention. While certain nomenclature and types of applications/hardware are described, other names and application/hardware usage is possible and the nomenclature is provided by way of non-limiting examples only. Further, while particular embodiments are described, it should be appreciated that the features and functions of each embodiment may be combined in any combination as is within the capability of one skilled in the art. The figures provide additional exemplary details regarding the various embodiments.

Various exemplary methods are provided by way of example herein. The methods described can be executed or otherwise performed by one or a combination of various systems and modules.

The use of the term computer system in the present disclosure can relate to a single computer or multiple computers. In various embodiments, the multiple computers can be networked. The networking can be any type of network, including, but not limited to, wired and wireless networks, a local-area network, a wide-area network, and the Internet.

According to exemplary embodiments, the System software may be implemented as one or more computer program products, for example, one or more modules of computer program instructions encoded on a computer-readable medium for execution by, or to control the operation of, data processing apparatus. The implementations can include single or distributed processing of algorithms. The computer-readable medium can be a machine-readable storage device, a machine-readable storage substrate, a memory device, or a combination of one or more them. The term "processor" encompasses all apparatus, devices, and machines for processing data, including by way of example a programmable processor, a computer, or multiple processors or computers. The apparatus can include, in addition to hardware, software code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

A computer may encompass all apparatus, devices, and machines for processing data, including by way of example a programmable processor, a computer, or multiple processors or computers. It can include, in addition to hardware, code that creates an execution environment for the computer program in question, e.g., code that constitutes processor firmware, a protocol stack, a database management system, an operating system, or a combination of one or more of them.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computer-readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While the embodiments have been particularly shown and described within the framework for conducting analysis, it will be appreciated that variations and modifications may be affected by a person skilled in the art without departing from the scope of the various embodiments. Furthermore, one skilled in the art will recognize that such processes and systems do not need to be restricted to the specific embodiments described herein. Other embodiments, combinations of the present embodiments, and uses and advantages of the will be apparent to those skilled in the art from consideration of the specification and practice of the embodiments disclosed herein. The specification and examples should be considered exemplary.

What is claimed is:

1. A computer-implemented system for implementing a collaboration platform that analyzes at least unstructured data, the system comprising:

a file ingestion interface that communicates with one or more data sources via a communication network; and a computer processor coupled to the file ingestion interface and further programmed to perform the steps of:

ingesting, via the file ingestion interface, unstructured data from the one or more data sources;

initiating an annotation process that comprises: (1) applying a corpus exploration tool to identify a representative set from a corpus that comprises the unstructured data wherein the representative set is relevant to a specific query and (2) applying a rapid annotation tool that applies an artificial intelligence (AI) tool to extract responses relevant to the query as applied to the representative set;

enabling, via a collaboration interface, a subject matter expert (SME) to perform a verification on the responses extracted from the representative set;

based on the verification, refining the responses through a feedback process that applies the responses to the annotation process through a machine learning (ML) algorithm; and responsive to the annotation process, building a model to identify and extract a response relevant to the query as applied to a specified input.

2. The system of claim 1, wherein the representative set comprises a unique set of excerpts relevant to the query.

3. The system of claim 1, wherein the corpus comprises one or more of:

security prospectus, debt deal documentation, mutual fund prospectus and loan documents.

4. The system of claim 1, wherein the corpus comprises a combination of structured and unstructured data from multiple disparate data sources.

5. The system of claim 1, wherein the computer processor comprises a plurality of processors distributed across a cluster of computers.

6. The system of claim 1, wherein the SME interacts with the collaboration interface to approve or reject an annotation or a response.

7. The system of claim 1, wherein the collaboration interface displays a set of guidelines as the SME interacts with an annotation or response.

8. The system of claim 1, wherein the corpus exploration tool applies a combination of terms, document language and metadata to identify the representative set.

9. The system of claim 1, wherein the annotation tool captures domain specific information about the unstructured data.

10. The system of claim 1, wherein the representative set comprises a unique subset of data from the corpus.

11. A computer-implemented method for implementing a collaboration platform that analyzes at least unstructured data, the method comprising the steps of:

ingesting, via a file ingestion interface, unstructured data from the one or more data sources wherein the file ingestion interface that communicates with one or more data sources via a communication network;

initiating, via a computer processor, an annotation process that comprises: (1) applying a corpus exploration tool to identify a representative set from a corpus that comprises the unstructured data wherein the representative set is relevant to a specific query and (2) applying a rapid annotation tool that applies an artificial intelligence (AI) tool to extract responses relevant to the query as applied to the representative set;

enabling, via a collaboration interface, a subject matter expert (SME) to perform a verification on the responses extracted from the representative set;

based on the verification, refining the responses through a feedback process that applies the responses to the annotation process through a machine learning (ML) algorithm; and responsive to the annotation process, building a model to identify and extract a response relevant to the query as applied to a specified input.

12. The method of claim 11, wherein the representative set comprises a unique set of excerpts relevant to the query.

13. The method of claim 11, wherein the corpus comprises one or more of:

security prospectus, debt deal documentation, mutual fund prospectus and loan documents.

14. The method of claim 11, wherein the corpus comprises a combination of structured and unstructured data from multiple disparate data sources.

15. The method of claim 11, wherein the computer processor comprises a plurality of processors distributed across a cluster of computers.

16. The method of claim 11, wherein the SME interacts with the collaboration interface to approve or reject an annotation or a response.

17. The method of claim 11, wherein collaboration interface displays a set of guidelines as the SME interacts with an annotation or response.

18. The method of claim 11, wherein the corpus exploration tool applies a combination of terms, document language and metadata to identify the representative set.

19. The method of claim 11, wherein the annotation tool captures domain specific information about the unstructured data.

20. The method of claim 11, wherein the representative set comprises a unique subset of data from the corpus.

* * * * *